United States Patent [19]

Fogle et al.

[11] 4,169,005
[45] Sep. 25, 1979

[54] METHOD FOR SURFACING A WOOD PANEL WITH A PLASTIC FILM

[75] Inventors: Ozzie Fogle; James Cooley, both of Orangeburg, S.C.

[73] Assignee: Champion International Corporation, Stamford, Conn.

[21] Appl. No.: 829,718

[22] Filed: Sep. 1, 1977

[51] Int. Cl.² .................. B27M 1/08; B29C 27/10
[52] U.S. Cl. ...................... 156/272; 144/309 Q; 144/309 Y; 156/280; 156/314; 156/320; 427/54; 427/207 A; 427/408
[58] Field of Search ............... 156/237, 241, 272, 280, 156/314, 320; 144/309 Q, 309 Y; 427/54, 207 A, 408

[56] References Cited

U.S. PATENT DOCUMENTS

| | | | |
|---|---|---|---|
| 2,632,710 | 3/1953 | Mayers | 427/408 X |
| 3,017,287 | 1/1962 | Berry et al. | 427/408 X |
| 3,287,197 | 11/1966 | Errede | 156/272 |
| 3,502,533 | 3/1970 | Reiss | 427/408 X |
| 3,644,161 | 2/1972 | Hall | 156/272 |
| 3,713,935 | 1/1973 | Grecchi | 156/272 X |
| 3,867,153 | 2/1975 | MacLachlan | 156/272 X |
| 4,113,894 | 9/1978 | Koch | 156/272 |

Primary Examiner—Michael G. Wityshyn
Attorney, Agent, or Firm—Evelyn M. Sommer

[57] ABSTRACT

In a process for surfacing a hardwood veneer with a plastic film, one surface of the hardwood veneer is first sanded to provide a smooth surface for prefinishing, followed by the application of a stain or toner to achieve the desired color and appearance of the panel. A first coat of adhesive is applied to the smooth surface of the panel and allowed to dry, followed by the application of a second coat of adhesive which is also subsequently dry. Next, the panel is heated to reactivate both coats of adhesive, and a clear plastic film is applied to the smooth surface of the hardwood veneer and laminated thereto. Next, an ultra-violet curable topcoat is applied to the plastic sheet and allowed to cure, thereby resulting in a surface that has excellent scratch, mar and burnish resistance.

16 Claims, 1 Drawing Figure

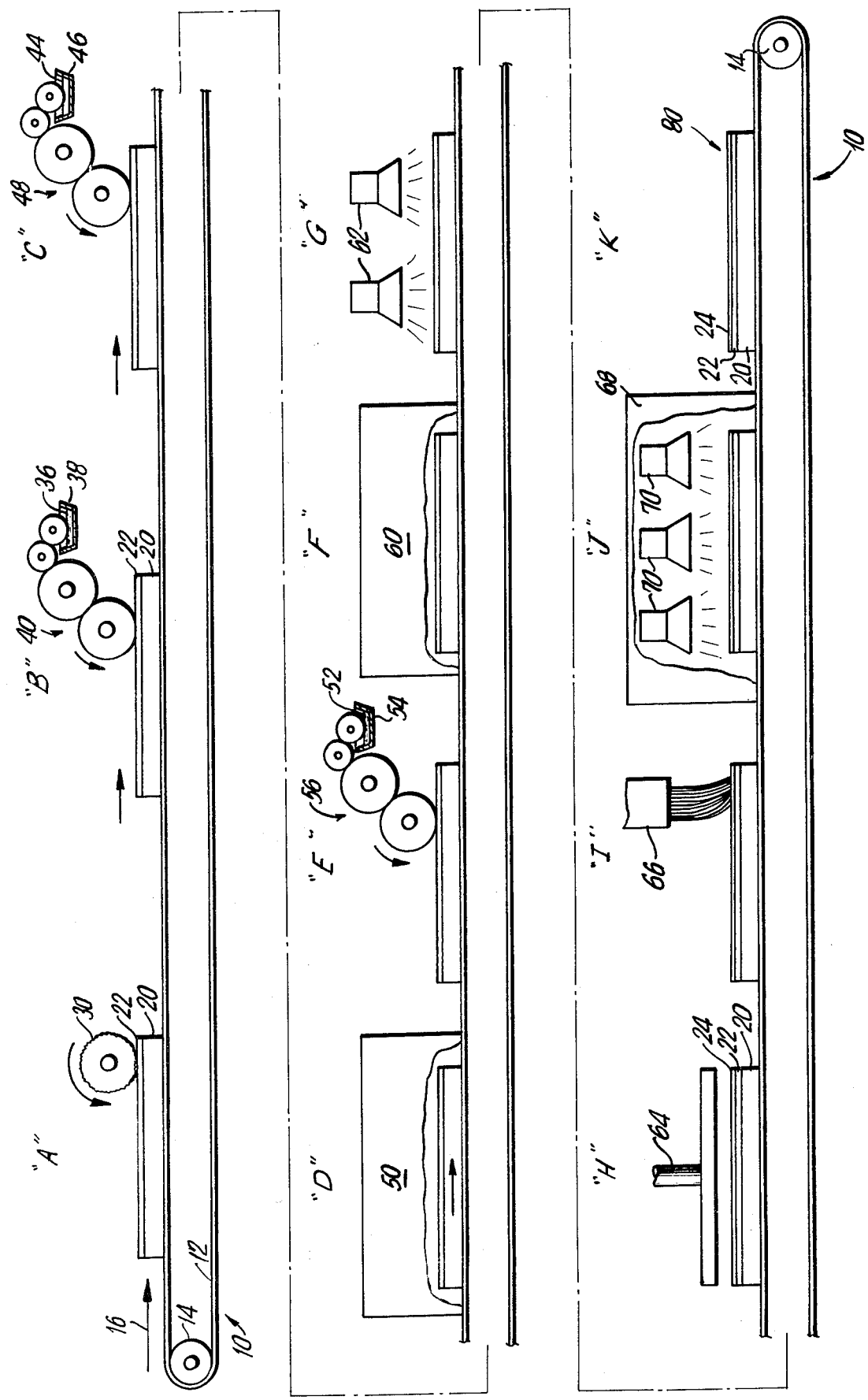

METHOD FOR SURFACING A WOOD PANEL WITH A PLASTIC FILM

The present invention relates to a new and improved process for surfacing a wood panel with a plastic film, and more particularly a new and improved process for coating a panel with resin compositions to form a finished panel product that is suitable for sawing, cutting and assembling into furniture, bookcases, etc., with the panel having an excellent scar, mar, and burnish resistance surface, and improved resistance to yellowing of the hardwood substrate or the coating.

Heretofore it has been common to apply a resin composition in fluid form by spraying or painting or the like, and in some cases, the coating so formed has been caused to harden by baking the coated panel, or by applying the composition in the form of two layers which react together to harden, with the two layers being simply bonded together by a urethane type adhesive. Laminated panels made by the prior art techniques have generally exhibited severe yellowing of the adhesive layers after twenty hours exposure to a fadeometer. Accordingly, it is an object of the subject invention to provide a new and improved process for coating a real hardwood veneer so as to form a lamination having improved resistance to yellowing of the substrate or the adhesive, and also having improved structural qualities such as taber water resistance, scratch, mar and burnish resistance, stain resistance, improved depth of finish and clarity, and a laminated structure that is suitable for sawing, cutting and assembling in order to form various types of furniture such as bookcases, paneling, and the like.

In the process of the subject invention, a hardwood substrate such as oak, birch, walnut, elm, etc., may be glued to a particleboard or veneer core material, and is then processed in order to provide a plastic film on one or both surfaces thereof. In the subject process, the hardwood surface substrate is first sanded in a conventional manner to provide a smooth surface for prefinishing. A stain or toner coat is applied by a direct rollcoat application to the surface of the hardwood to achieve the desired color and appearance. The material may be vinyl, acrylic, or an alkyd base toner with either pigments or dyes. Next, a urethane adhesive is directly applied to the surface of the hardwood by a direct rollcoat process to a desired thickness, and this first coat of adhesive is dried at a designated temperature in a dryer oven. A second coat of urethane adhesive is applied to the dried first coat of adhesive, and the second coat of adhesive is subsequently processed through an oven dryer. The composite structure of the hardwood substrate and the several coats of urethane adhesive applied thereto is then heated to a designated temperature to reactivate the first and second coats of adhesive, and a thin clear film of poly-vinyl chloride sheet is laminated to the hardwood substrate. Next, the board which has been laminated with the clear vinyl is then passed under a curtain coater to apply a ultraviolet curable topcoat, and subsequently the ultraviolet curable topcoat is cured by passing under a series of ultraviolet lamps.

The resulting product has been found, according to actual tests, to be capable of withstanding between 65 and 100 hours of exposure to a fadeometer before any moderate change in coloring is seen in the substrate or the urethane adhesive. This is in sharp contrast to conventional plastic coated sheets wherein normal adhesives have severe yellowing after approximately twenty hours of exposure to a fadeometer. Furthermore, actual tests have established that under standard taber wear resistance, the product made according to the subject process has a wear resistance of 450 to 500 cycles, whereas standard hardwood has a maximum of approximately 25 cycles. In addition, the resulting product according to the subject invention has an excellent scratch, mar, and burnish resistant surface, has a greater depth of finish and clarity of the finished surface, and the resulting product may be readily sawed, cut, and assembled for manufacturing furniture, bookcases, etc.

Further objects and advantages of the invention will become apparent from the reading of the following detailed description taken in conjunction with the single FIGURE which schematically illustrates the process according to the subject invention.

Preferably, the process according to the subject invention is carried out in a continuous manner for increased production and manufacturing economy, with the wood panel to be surfaced comprising a core material 20 that is laminated with a hardwood substrate, designated 22. The core material 20 may comprise a sheet of particleboard, chipboard, or the like, while the hardwood substrate, one surface of which is to be surfaced with a plastic film, may be a veneer sheet of oak, birch, walnut, elm, or other similar hardwood material. The hardwood substrate 22 is bonded or glued to the particleboard 20. The various stages of the subject process are designated by the letters "A" through "J" inclusive, with the final product being indicated at stage "K".

In the first step of the subject process, designated stage "A", the surface of the hardwood substrate 22 is sanded by a conventional rotary sander 30 in a conventional manner to provide a smooth surface for prefinishing at stage "B". A stain or toner coat 36 provided in a container 38 is applied to the smooth surface of the hardwood substrate 22 by a direct rollcoat application, such as by the use of printing rolls 40 in order to achieve the desired color and appearance of the resulting panel. The stain or toner coat may be vinyl, acrylic, nitrocellulose, or alkyd base toner with either pigments or dyes, with the percent solids of the materials ranging from 0.5 to 10%.

At stage "C" in the subject process, a urethane adhesive 44 disposed in container 46 is directly applied by means of printer rolls 48 as a first coat to the smooth, stained surface of the hardwood substrate 22. The urethane adhesive is preferably of a thickness of 1½ wet mils, having a solids material content of 25–35%. Preferably, the urethane adhesive has added thereto from 0.5–5% by weight of ultra-violet absorber such as 2,4-dihydroxy-benzophenone, 2,2'-dihydroxy-4,4'-dimethoxy-benzophenone, 2,2', 4,4'-tetrahydroxy-benzophenone, 2-hydroxy-4-methoxy-benzophenone-5-sulfuric acid, sodium 2,2'-dihydroxy-4,4'-dimethoxy-5-sulfobenzophenone, ethyl-2-cyano-3,3-diphenyl acrylate, 2-ethylhexyl-2-cyano-3,3-diphenyl acrylate. This first coat of adhesive is then dried at stage "D" in a conventional oven 50 which is preferably at a temperature of 250° F. to 350° F. Next, at stage "E", a second coat of urethane adhesive 52 disposed in container 54 is applied to the surface of the hardwood substrate 22 by a direct rollcoat application utilizing printer rolls 56. As in the case of the first coat of urethane adhesive, the second coat of adhesive is applied preferably at a thickness of 1½ wet mils at a 25–35% solids material. At stage "F", the second coat of adhesive is dried in an oven 60 preferably at a temperature in the range of 250° F. to 350° F.

In order to prepare the surface of the hardwood substrate for lamination thereto with a plastic film sheet, and in order to reactivate the first and second coats of adhesive, at stage "G" the panel board is subjected to a surface temperature of approximately 250° F. by means of heating lamps 62 to reactivate the adhesive, after which, at stage "H", a clear poly-vinyl chloride film sheet 24 is laminated to the surface of the hardwood substrate 22 by suitable press means, designated by numeral 64. The latter may alternatively be in the form of a rubber roll, and the thickness of the clear vinyl chloride film sheet 24 may be on the order of 2 to 6 mils thick. The rubber roll may be heated, e.g., at 250° F. At stage "I" the panel which has been laminated with the clear vinyl sheet 24 is then passed under a curtain coater 66 to apply approximately 2 mils of an ultra-violet curable topcoat. The topcoat is preferably a 100% solids polyacrylate resin with 10-20% silica pigments and 1-3% photoinitiator. At stage "J" the composite panel is passed through ultra-violet oven 68 where the coating is then cured by a series of ultra-violet lamps 70 operating at approximately 200 watts per square inch. The number of ultra-violet lamps 70 used in the oven 68 depends on the speed of conveyance of the conveyor 10, and as an example, in a system where the conveyor line speed is 125 feed per minute, a total of ten ultra-violet lamps 70 may be required. At stage "K", the final hardwood panel surface with the plastic sheet film 24 is shown and designated by the numeral 80.

In comparative tests between the hardwood panel 80 made according to the subject invention, and a panel made according to a conventional process, it has been found that panel 80 has superior performance characteristics. In standard Taber Wear tests, the panel 80 has exhibited wear resistance for 450 to 500 cycles, whereas in similar tests a standard hardwood panel has exhibited a maximum of 25 cycles prior to failure. Panel 80 has also exhibited excellent scratch, mar and burnish resistance, and in particular the finish surface on panel 80 readily complies with NEMA Stain Resistance Test LD 3-3.09, whereas normal hardwood finishes fail this test. It has also been observed that the finish surface of panel 80 has greater depth of finish and clarity as compared to standard hardwood type panels in comparative tests for yellowing exposed to a fadeometer. The hardwood panel 80 and adhesive employed therein have withstood 65 to 100 hours of exposure before any moderate change was observed. On the other hand, standard panels and adhesives used therein have exhibited severe yellowing after twenty hours of exposure to a fadeometer. Still further, hardwood panel 80 is suitable for sawing, cutting and assembling into furniture pieces and other forms of finished products.

Although the process of the subject invention has been described with a specific embodiment thereof, it is readily apparent that modifications and variations may be made without departing from the spirit and scope of the invention as defined by the appended claims.

What is claimed is:

1. A method for surfacing a wood panel with a plastic film comprising the steps of:
   (A) sanding one surface of the wood panel to provide a smooth surface for prefinishing;
   (B) applying a stain or toner to said smooth surface of the panel to achieve the desired color and appearance;
   (C) applying a first coat of adhesive to the smooth surface of said panel;
   (D) drying said first coat of adhesive;
   (E) applying a second coat of adhesive to the smooth surface of said panel;
   (F) drying said second coat of adhesive;
   (G) heating said panel to reactivate said first and second coats of adhesives;
   (H) applying a clear plastic sheet to said smooth surface;
   (I) laminating said plastic sheet to the smooth surface of said panel;
   (J) applying an ultra-violet curable topcoat to the plastic sheet; and
   (K) curing said ultra-violet top coat.

2. A method for surfacing a wood panel with a plastic film as in claim 1 wherein said process is carried out in a continuous manner.

3. A method for surfacing a wood panel with a plastic film as in claim 1 wherein said wood panel is first formed by laminating a hardwood veneer substrate to a core material and thereafter the hardwood veneer substrate of the wood panel is sanded.

4. A method for surfacing a wood panel with a plastic film as in claim 1 wherein said stain or toner coat is applied to the smooth surface of the panel by a direct rollcoat application.

5. A method for surfacing a wood panel with a plastic film as in claim 1 wherein said stain or toner coat is a vinyl, acrylic, nitrocellulose, or alkyd base toned with either pigments or dyes, and with the percent solids of the materials in the range of 0.5 to 10%.

6. A method for surfacing a wood panel with a plastic film as in claim 1 wherein said first coat of adhesive is applied by a direct rollcoat process.

7. A method for surfacing a wood panel with a plastic film as in claim 1 wherein said first coat of adhesive and said second coat of adhesive are each applied at a depth of approximately 1½ wet mils, having a 25 to 35% solids material.

8. A method for surfacing a wood panel with a plastic film as in claim 1 wherein the adhesive as used in said first and second coats has added thereto from 0.5-5% by weight of UV absorber such as 2,4-dihydroxybenzophenone, 2,2'-dihydroxy-4,4-dimethoxy-benzophenone, 2,2',4,4'-tetrahydroxybenzophenone, 2-hydroxy-4-methoxy-benzophenone-5-sulfonic acid, sodium 2,2'-dihydroxy-4,4-dimethoxy-5-sulfobenzophenone, ethyl-2-cyano-3,3-diphenyl acrylate, and 2-ethylhexyl-2-cyano-3,3-diphenyl acrylate.

9. A method for surfacing a wood panel with a plastic film as in claim 1 wherein said first coat of adhesive is dried at a temperature in the range of 250° F. to 350° F.

10. A method for surfacing a wood panel with a plastic film as in claim 1 wherein said second coat of adhesive is dried at a temperature in the range of 250° F. to 350° F.

11. A method for surfacing a wood panel with a plastic film as in claim 1 wherein said first and second coats of adhesive are dried in an oven at a conveying speed of approximately 100 feet per minute.

12. A method for surfacing a wood panel with a plastic film as in claim 1 wherein said plastic sheet is made of a clear poly-vinyl chloride film having a thickness in the range of 2 to 6 mils.

13. A method for surfacing a wood panel with a plastic film as in claim 1 wherein said plastic sheet is laminated to said wood panel by a rubber roll at a temperature of approximately 250° F.

14. A method for surfacing a wood panel with a plastic film as in claim 1 wherein the ultraviolet curable topcoat is applied at a thickness of approximately 2 mils.

15. A method for surfacing a wood panel with a plastic film as in claim 1 wherein said ultra violet curable top coat is a 100% solids polyacrylate resin with 10-20% silica pigments and 1-3% photoinitiator.

16. A method for surfacing a wood panel with a plastic film as in claim 1 wherein said ultraviolet curable topcoat is cured by passing the laminate under a series of ultraviolet lamps.

* * * * *